United States Patent [19]

Smitt et al.

[11] Patent Number: 4,685,124
[45] Date of Patent: Aug. 4, 1987

[54] MICROPROCESSOR BASED CONTROL AND SWITCHING DEVICE

[75] Inventors: Eric L. Smitt, Worcester; Robert J. Collins, Millis, both of Mass.

[73] Assignee: Data General Corporation, Westboro, Mass.

[21] Appl. No.: 728,983

[22] Filed: Apr. 30, 1985

[51] Int. Cl.⁴ ........................................... H04M 11/00
[52] U.S. Cl. ........................................ 379/95; 379/93
[58] Field of Search .............. 179/2 A, 2 C, 2 DP; 178/22.08, 22.09; 364/200 MS File, 900 MS File; 379/93, 95, 96, 97, 98, 442, 443

[56] References Cited

U.S. PATENT DOCUMENTS

| 3,889,062 | 6/1975 | Epstein | 179/2 DP |
| 3,984,637 | 10/1976 | Caudill et al. | 179/2 DP |
| 4,048,672 | 9/1977 | Seiden et al. | 364/200 |
| 4,356,545 | 10/1982 | West | 179/2 DP X |
| 4,484,306 | 11/1984 | Kulczyckyj et al. | 364/900 |
| 4,531,023 | 7/1985 | Levine | 179/2 DP X |
| 4,546,213 | 10/1985 | Dick | 179/2 A |

FOREIGN PATENT DOCUMENTS

| 18129 | 10/1980 | European Pat. Off. | 178/22.08 |
| 2552286 | 3/1985 | France | 179/2 DP |
| 2052210 | 1/1981 | United Kingdom | 179/2 DP |

Primary Examiner—Keith E. George
Attorney, Agent, or Firm—Jacob Frank; Joel Wall; Irving M. Kriegsman

[57] ABSTRACT

A control and switching device which is installed at a customer's computer (local) site and which links a remote terminal by modems over telephone lines to the system console, the TTO/TTI port and the ALM/IAC port of the host computer, and to a user terminal for remote diagnosis of hardware and software problems is disclosed. The device, which is coupled by separate lines to the modem at the local site, the system console, the user terminal the TTO/TTI port and the ALM/IAC port of the host computer includes a microprocessor a memory, various logic and control circuits and a three position keyswitch. The keyswitch provides a first level of security and limits the type of access allowed by a remote caller. When the switch is in a first position, the caller has no access to the host system. When the switch is in a second position, the remote caller can connect to the ALM/IAC port or communicate with the user terminal but cannot change configuration data. When the switch is in a third position, the remote caller can connect to both ports of the host system and can change configuration parameters. Second and third levels of security are provided by means of a special password and a dial-back feature. A variety of firmware commands are stored in the device.

19 Claims, 13 Drawing Figures

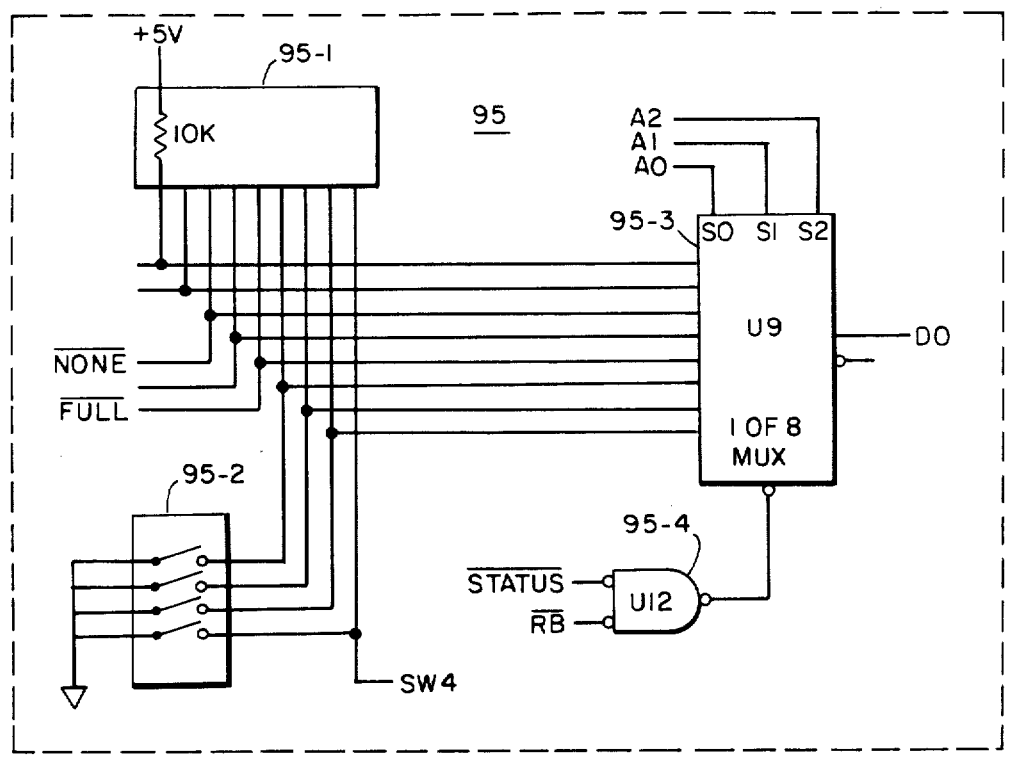
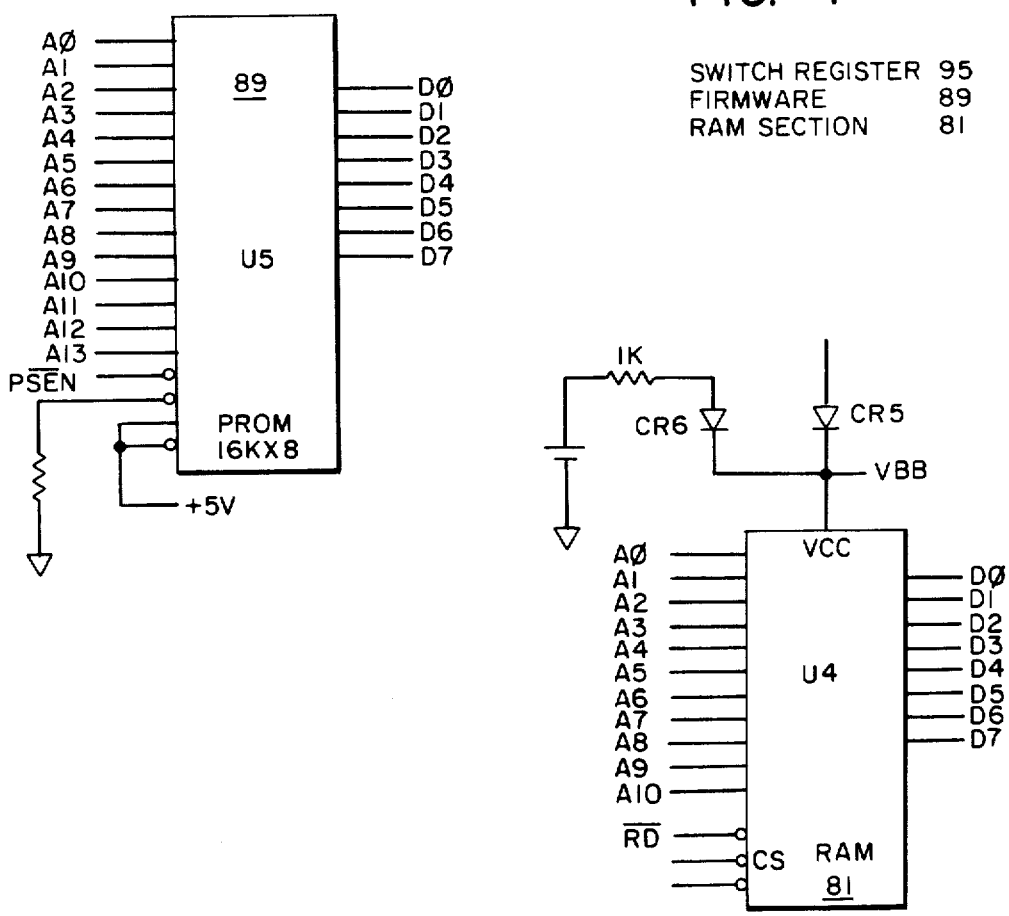
FIG. 4
SWITCH REGISTER 95
FIRMWARE 89
RAM SECTION 81

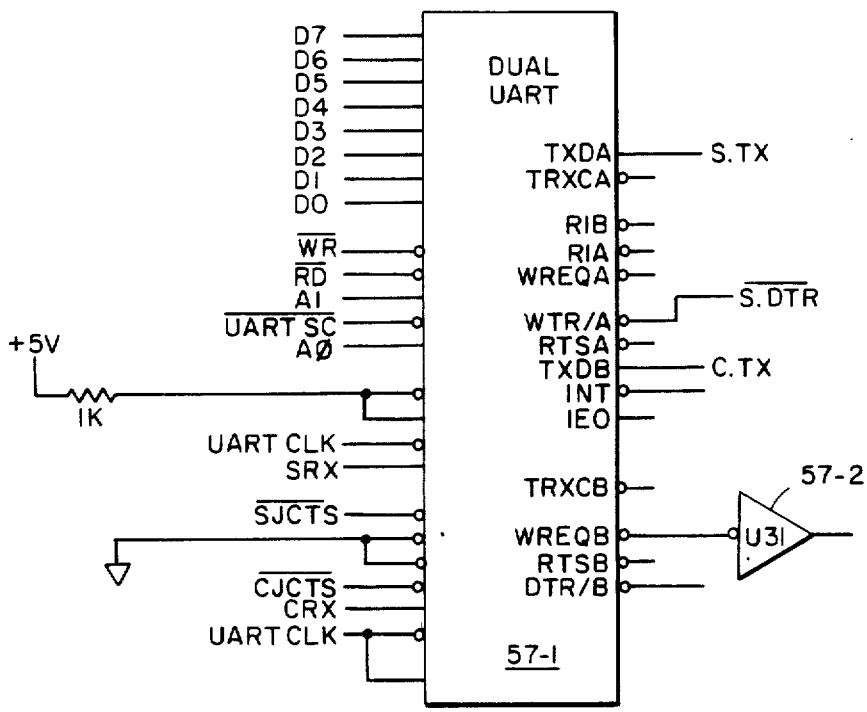
FIG. 6
SYSTEM CONSOLE PORT/
CPU PORT DUAL UART 57
CPU PORT DRIVERS
(PART) 69
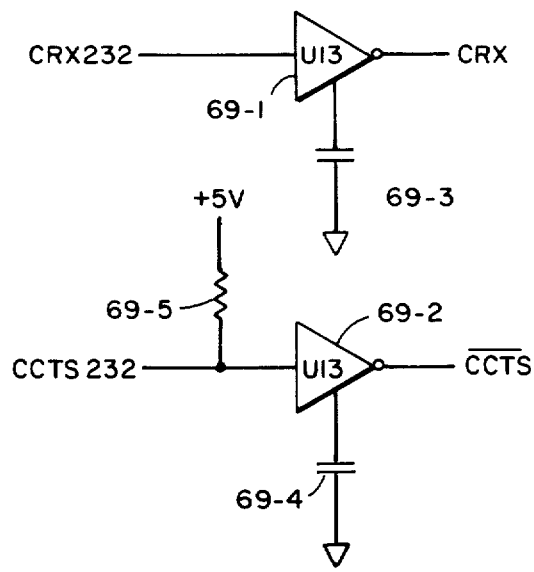

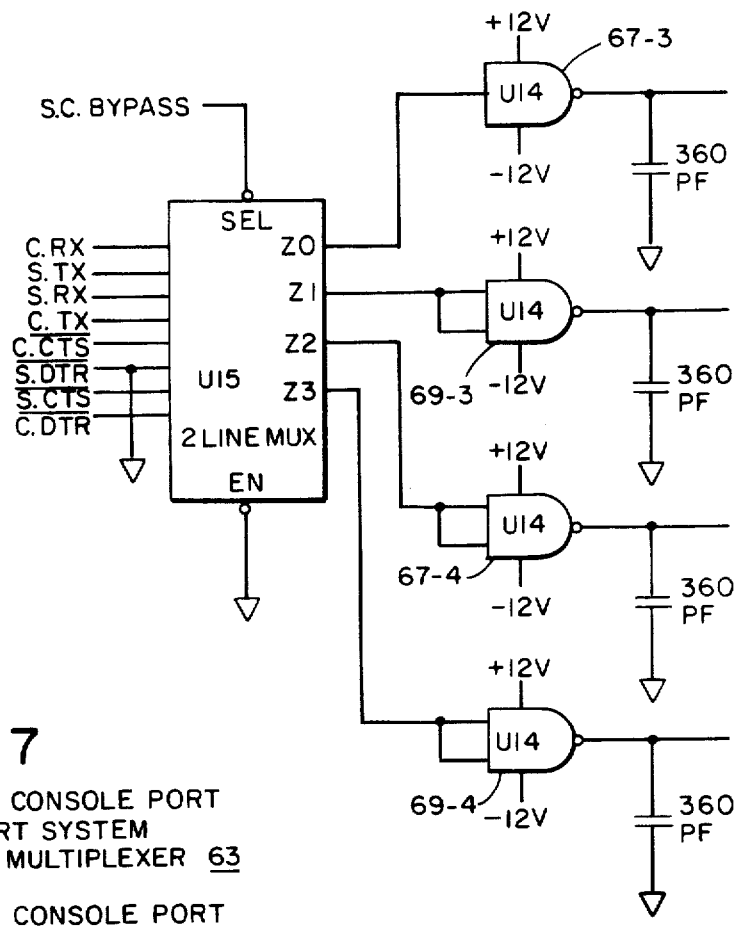
FIG. 7
SYSTEM CONSOLE PORT
CPU PORT SYSTEM
BYPASS MULTIPLEXER 63
SYSTEM CONSOLE PORT
RS 232 DRIVERS 67
CPU PORT RS 232
DRIVERS 69
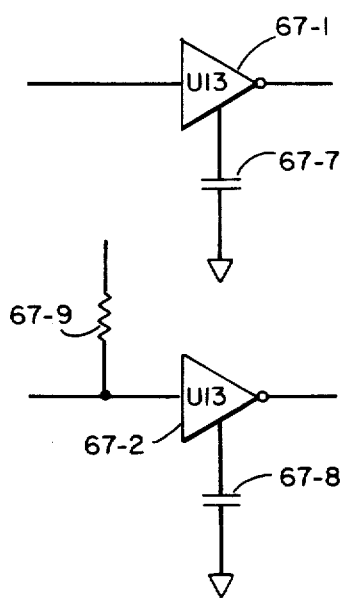

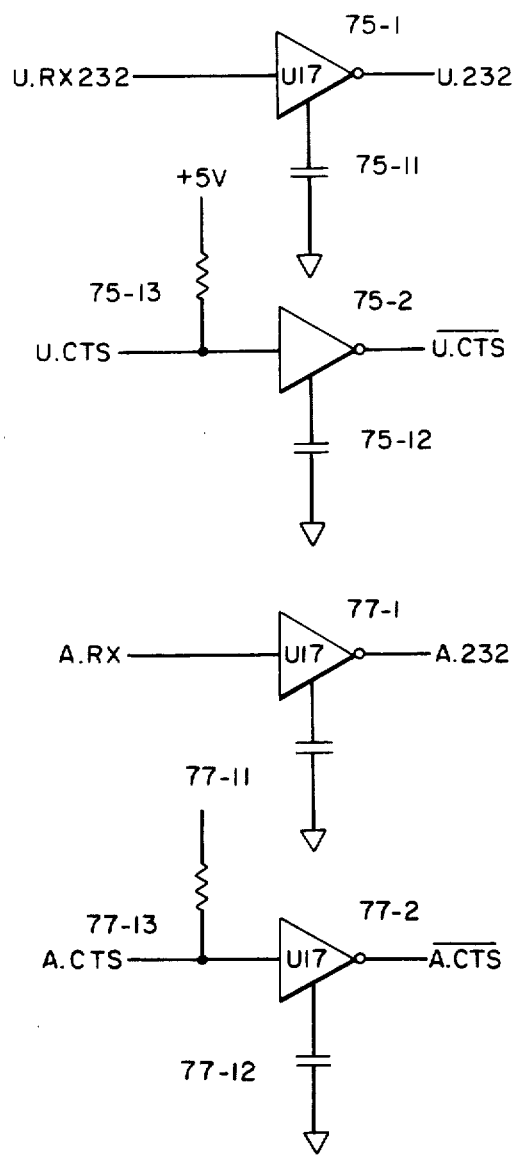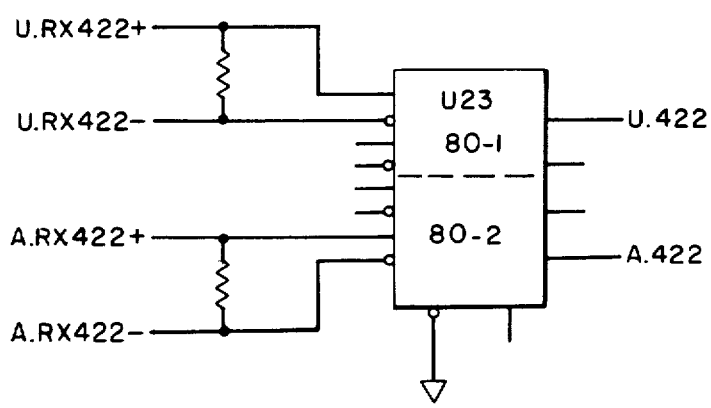
FIG. 10
RS-232/RS-422
CURRENT LOOP
INTERFACE LOGIC 75 (PART)
RS-232/RS-422
CURRENT LOOP
INTERFACE LOGIC 77 (PART)

FIG. 11  RS-232 BUFFER SECTION 55

FIG. 12 WATCHDOG TIMER SECTION 83 (PART)

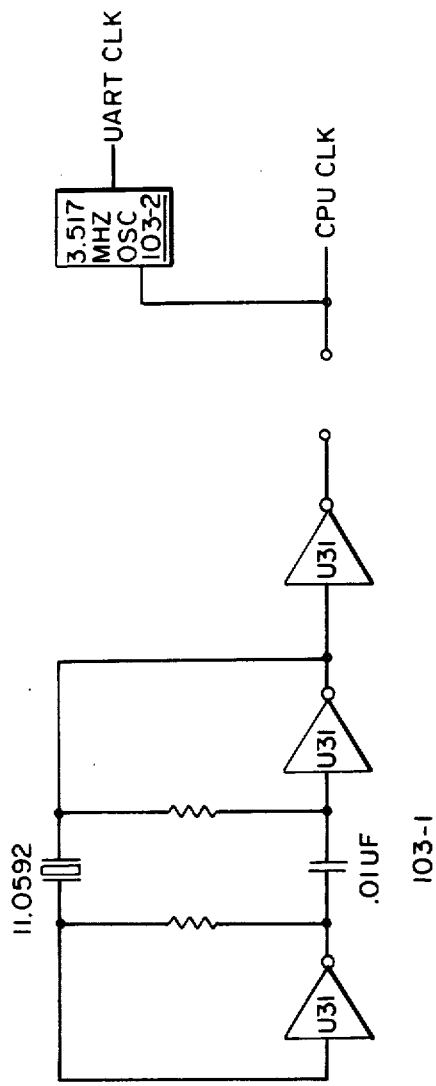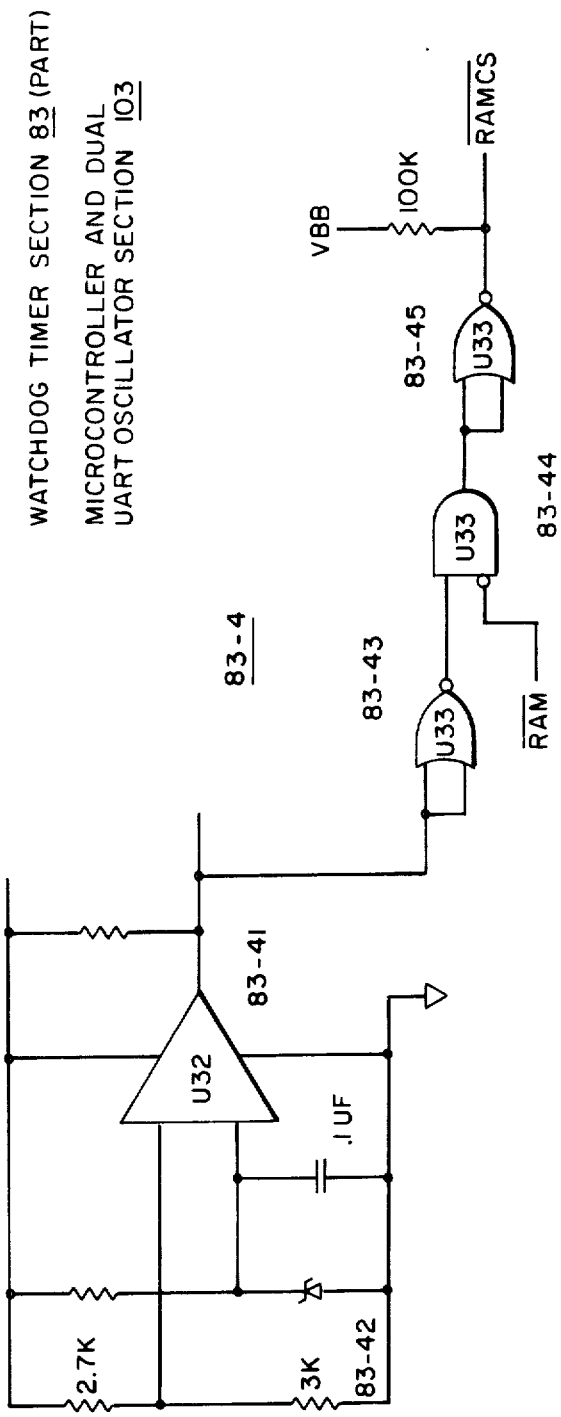
FIG. 13
WATCHDOG TIMER SECTION 83 (PART)
MICROCONTROLLER AND DUAL
UART OSCILLATOR SECTION 103

MICROPROCESSOR BASED CONTROL AND SWITCHING DEVICE

BACKGROUND OF THE INVENTION

The present invention relates generally to computer networks and more particularly to a line powered control and switching device for selectively coupling a remote terminal at a remote location through modems and a telephone line to a system console, the TTO/TTI port and ALM/IAC port of a host computer and to a user terminal for remote diagnosis of hardware and software problems and which provides different degrees of access of the remote terminal and a variety of operating modes.

It is not uncommon for computer systems users to experience hardware or operational software problems in the day-to-day use of their equipment. In some instances the problems are such that they can be diagnosed and/or corrected by on-site personnel; however, in most cases the user does not possess the technical skills needed to properly diagnose and then correct the fault. When this occurs it is generally necessary to obtain outside assistance from a technical expert at a support center.

In the past, attempts have been made to diagnose and correct operational problems by calling the support center over a telephone and describing to a technical expert at a support center what appears to be the particular problem. This technique has not proven to be very successful, mainly because of the inability of the person at the user site to accurately describe the problem and/or what he is actually observing on his display terminal. Furthermore, the technique does not enable the technical expert to actually control the operations of the computer at the user site.

Another technique that has been employed in the past has involved connecting the CPU and the display terminal at the user site to an acoustic coupler through a double throw switch. When the switch is placed in one position the CPU is connected to the display terminal and is operable with the display terminal as a user site computer. When the switch is placed in the other position the CPU is connected to the acoustic coupler. Using this arrangement it is possible to connect the CPU to either the display terminal at the user site or through a telephone link and second acoustic coupler to a display terminal at the support center. The basic problem with this technique is that although it allows either the display terminals at the user site or the display terminal at the support center to be connected to the CPU it does not allow both display terminals to be connected to and be in communication with the CPU at the same time. Thus, it does not enable a person at the support center to monitor operations of the display terminal at the user site or the operator at the user site to observe the communications between the display terminal at the support center and the CPU. In addition, once the telephone instruments at each location are inserted into their respective acoustic couplers there is no way for the person at one location to signal to the person at the other location to remove the telephone instrument from the acoustic coupler if the person wants to reestablish voice communications or return to the original operating mode.

In U.S. Pat. No. 4,356,545 to K. J. West there is described an apparatus for monitoring and/or controlling the operations of a computer at a user site from a support center over a telephone line, the computer at the user site including a central processing unit (CPU) and a display terminal. The apparatus includes a telephone instrument at each location connected to the telephone line, a display terminal connected to an acoustic coupler at the support center and a control and switching device at the user site connected to the CPU, to the display terminal at the user site and to an acoustic coupler. When a link is established between the acoustic coupler at the support center and the acoustic coupler at the user site over the telephone line, the display terminal at the support center is operable with the display terminal at the user site in either an on-line mode or a conversational mode. In the on-line mode, either display terminal can input to the CPU and the output from the CPU is displayed at both display terminals. In the conversational mode, the CPU is disengaged and inputs from either display terminal are displayed at both display terminals. In the absence of the link, the display terminal at the user site is operable with the CPU through the control and switching device.

In copending U.S. patent application Ser. No. 528,566 filed on Aug. 31, 1983 and assigned to the assignee of this application there is disclosed a control and switching device which links a remote terminal by modems over telephone lines to a local central processing unit (CPU) and a local computer console terminal. The device, which is coupled by separate lines to the modem at the local site, the local console and the TTY and ASYNC ports of the CPU, includes a microprocessor, a memory, logic circuits and a switch assembly. The switch assembly includes first, second and third switches which are interlocked and which allow three different levels of remote access of the remote terminal. When the first switch is depressed, the device is powered down, the remote terminal has no access to either the TTY or ASYNC ports of the CPU and the local console is hardwired through the device to the TTY port of the CPU. When the second switch is depressed, the local console is hardwired to the TTY port of the CPU and the remote terminal is electrically connected to the ASYNC port of the CPU. When the third switch is depressed, the local console and the remote terminal both have access to either the TTY port or the ASYNC port of the CPU. A variety of firmware commands stored in the device, some of which may be applied by the local console and some by the remote terminal, depending on which switch is depressed, provide a number of different operating modes, the modes including a conversation mode wherein the CPU is locked out and the local console and remote terminal can communicate directly with each level.

It is an object of this invention to provide a new and improved control and switching device for allowing a remote terminal at a remote site to access a local system at a local site through modems over a telephone line.

It is another object of this invention to provide a control and switching device as described above which enables the remote terminal to access the local system for diagnosis and fault determination of hardware and software problems.

It is still another object of this invention to provide a control and switching device as described above which is microprocessor based.

It is yet still another object of this invention to provide a control and switching device as described above which provides multiple levels of security.

It is a further object of this invention to provide a control and switching device as described above which does not reduce the number of user terminals that may be connected to the computer system.

It is another object of this invention to provide a control and switching device as described above which provides multiple levels of access.

It is still another object of this invention to provide a control and switching device which allows a remote terminal to access a local CPU either as a user or for diagnostic/maintenance purposes.

It is a further object of this invention to provide a control and switching device as described above wherein either the local computer console terminal or the remote terminal can be made master.

It is another object of this invention to provide a control and switching device as described above which is completely under control of the local console operator.

It is still another object of this invention to provide a control and switching device as described above which is easy to install.

SUMMARY OF THE INVENTION

A control and switching device which allows a remote terminal to access, by modems over a telephone line, a local system having a host computer, a system console and at least one user terminal according to the teachings of the present invention includes a microprocessor, a memory, logic and control circuits and a switch assembly. The control and switching device has a first port which is adapted to be coupled to the system console, a second port which is adapted to be coupled to the TTO/TTI port of the host coomputer, a third port which is adapted to be coupled to the ALM/IAC port of the host computer, a fourth port which is adapted to be coupled to the modem at the site of the local system and a fifth port which is adapted to be coupled to a user terminal. The switch assembly includes a three position keyswitch which provides a first level of security and which allows three different levels of remote access of the remote terminal. When the switch is in a first position, the remote terminal has no access to the host computer. When the switch is in a second position the remote terminal has limited access to the host computer CPU. When the switch is in a third position the remote terminal has full access to the host computer. Second and third levels of security are provided by means of a password and a call back feature. A variety of firmware commands stored in the device, some of which may be applied by the local console and some by the remote terminal, provide a number of different operating modes, the modes including a conversation mode wherein the CPU is locked out and the local console and remote terminal can communicate directly with each other.

Various objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, an it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

Various features and advantages of the invention will become more readily apparent from the following detailed description of a specific embodiment of the invention when taken in conjunction with the accompanying drawings wherein like reference numerals represent like parts and wherein:

FIG. 4 is a schematic diagram of the switch register 95 the firmware 89 and the battery backed RAM 81 in the control and the switching device 11 shown in FIG. 1;

FIG. 6 is a schematic diagram of the drivers 69 for the CPU port and the DUAL UART 57 connected thereto in the control and switching device shown in FIG. 2;

FIG. 7 is a schematic diagram of some of the drivers 67 and 69 for the system console port and the CPU port and the signal by pass multiplexer 63 associated therewith in the control and switching device shown in FIG. 2;

FIG. 10 is a schematic diagram of a portion of the current loop interface logic for the shared user CRT port and the ALM/IAC port in the control and switching device shown in FIG. 2;

FIG. 13 is a schematic diagram of a portion of the watchdog timer section 83 and the microcontroller and DUAL UART oscillator section 81 in the control and switching device shown in FIG. 2.

DETAILED DESCRIPTION OF PREFERRED EMBODIMENT

The present invention is directed to a microprocessor based control and switching device which is installed at a customer's computer site for remote diagnosis of hardware and software problems. It is installed between the System console and the host TTO/TTI port, and between a User terminal and the host ALM/IAC port. This arrangement allows those functions normally accessible only at the local system console to be available remotely, as well as providing normal user activity. The fifth port is connected to an autodial modem to provide the remote access to the device.

By issuing commands to the device, traffic between the ports may be controlled and routed, enabling the remote user to control the customer's computer without actually going on site. Commands consist of single letters preceded by a BREAK.

Security for the customer is provided in three ways: a front panel keyswitch, a password, and dialback feature.

Configuration data (baudrates etc.), password, and dial strings are stored in battery-packed-up RAM, and Date and Time information is provided by a Clock/Calendar IC (kept alive by the same battery).

Bypass hardware ("straight-through") allows cabling and other basis installation procedures to be verified before proceeding with confuguration etc.

An extensive power-up selftest is provided, and any failure will result in a FAULT light indication, leaving the device in "straight-through" mode.

The front panel has indicators for Power, Fault, User and System remote connect modes, and all basic modem signals.

"Watch-dog" hardware forces a reset (and a fault indication) if the firmware gets lost.

Figure 1:
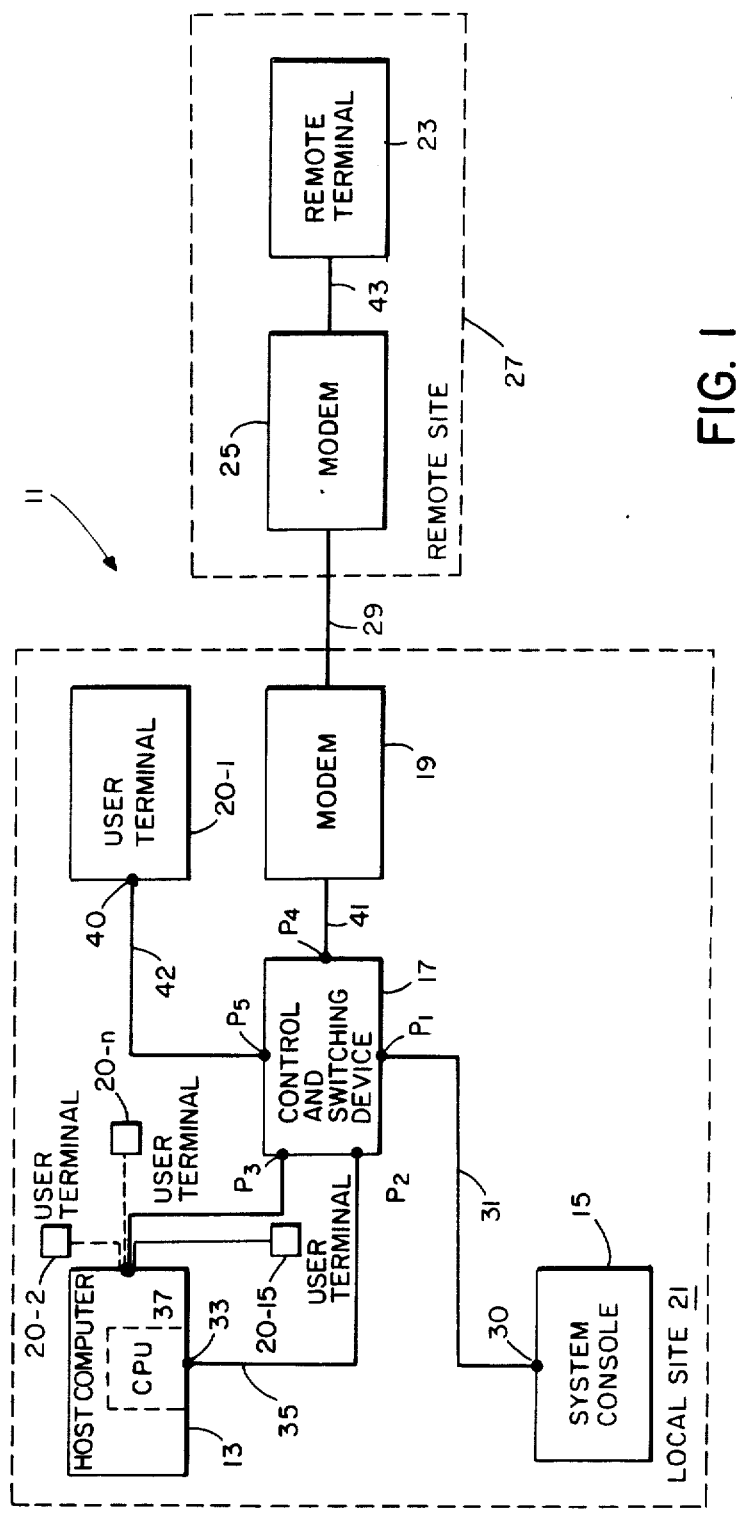
FIG. 1 is a block diagram of a computer network incorporating the control and switching device 11 of the present invention.

Referring now to the drawings, there is illustrated in FIG. 1 a computer network constructed according to the teachings of the present invention and identified generally by reference numeral 11.

Computer network 11 includes a host computer 13, a system console 15, a control and switching device 17, a modem 19 and a plurality of user terminals of which four are shown for illustrative purposes and labelled 20-1 through 20-4, which are all located at a first or local site 21 and a remote terminal 23 and a modem 25 which are located at a second or remote site 27.

Modem 19 at local site 21 is coupled to modem 25 at remote site 27 by conventional telephone lines 29.

System console 15 is connected through its port 30 to a first port P1 in control and switching device 17 by lines 31. Control and switching device 17 is connected through a second port P2 to the CPU port, that is the TTO/TTI (teletype out/teletype in) port 33 in host computer 13 by lines 35, through a third port P3 to the ALM/IAC (asynchronous line multiplexer/intelligent asynchronous line multiplexer) port 37 in host computer 13 by lines 39, through a fourth port P4 to modem 19 by lines 41 and through a fifth port P5 to port 40 in user terminal 20-1 over lines 42. User terminals 20-2 through 20-4 are connected to host computer 13 through ALM/IAC port 37.

Modems 19 and 25 are autodial type modems of any type that are compatable with each other.

Computer 13 is any known type such as the NOVA 3 CPU, made and sold by Data General Corporation of Westboro, Mass. System console 15 is is any known type of console that is operable with computer 13. Console 15 may be, for example, a Model No. 6053 display terminal made and sold by Data General Corporation of Westboro, Mass. Terminals 20 and 23 are any type of terminal operable with host computer 13 and can be, but do not have to be, the same type of display terminal as systems console 15 or even made by the same manufacturer as system console 15. As will hereinafter be described, control and switching device 17 selectively linkes remote terminal 23 to host computer 13, system console 15 and user terminal 20-1. Host computer 13, system console 15 and user terminals 20 constitute a local or user site computer system.

Telephone lines 29 are any type of telephone lines capable of transmitting voice and data information.

Modem 25 is connected to remote terminal 23 by lines 43. Modems 19 and 25 operate as a pair.

Figure 2:
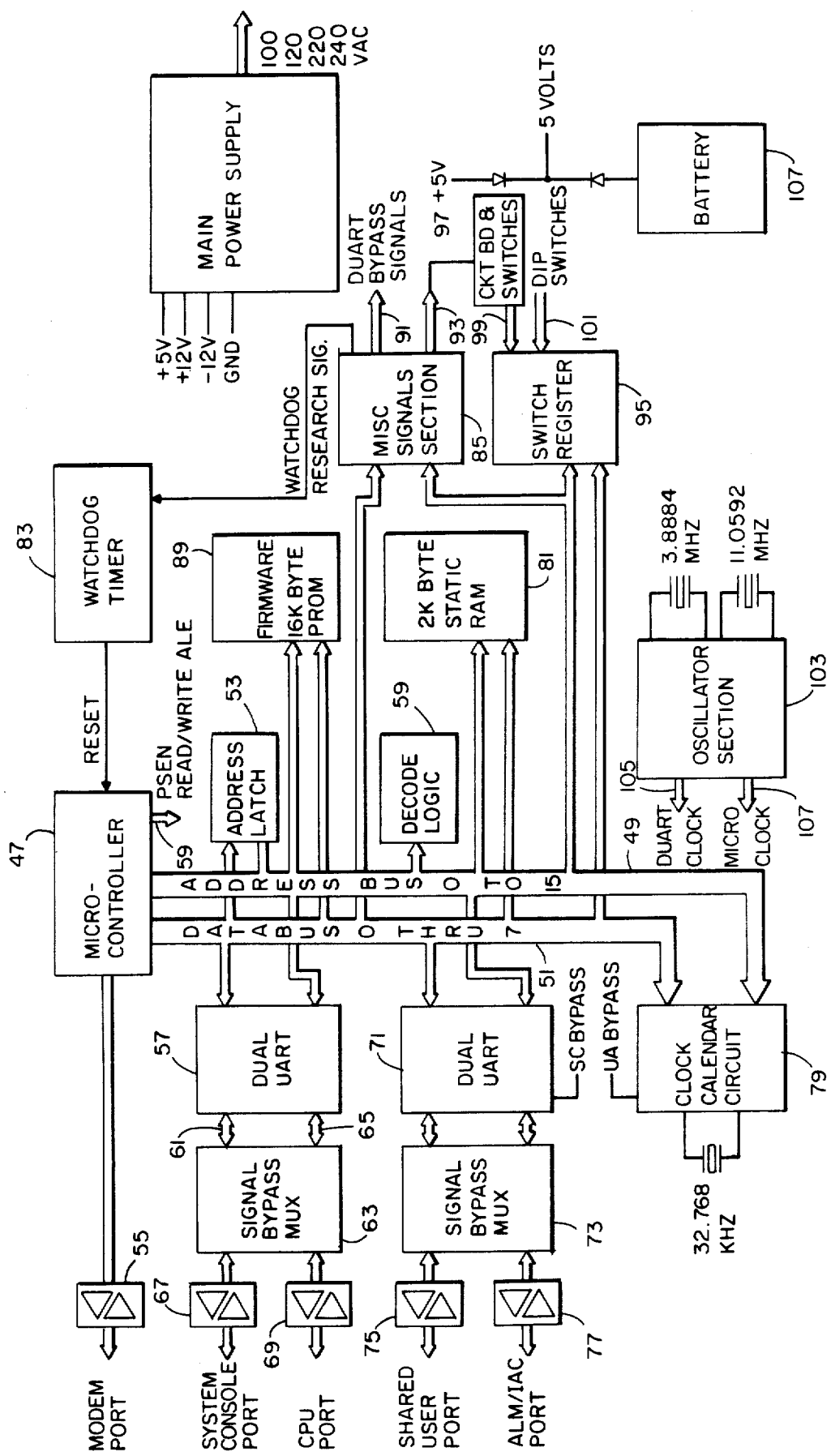
FIG. 2 is a block diagram of the control and switching device 11 shown in FIG. 1.

Referring now to FIG. 2 there is illustrated a block diagram of control and switching device 17.

As can be seen, control and switching device 17 includes a main power supply 45 which provides the power to operate the device. Main power supply 45 operates off of either 100, 120, 220 or 240 volts AC and provides +5, +12 and −12 volts.

Control and switching device 17 is organized around a microcontroller 47.

Microcontroller 47 is connected to a 16 bit address bus 49 and an 8 bit data bus 51. Buses 49 and 51 are both connected to an address latch 53 that discriminates between the time that bus 49 contains data information and the time bus 49 contains address information. A plurality of output and input line 53 are connected at one end to microcontroller 47 and at the other end to a set of buffers 55 that convert the TTL level of the signals on lines 53 to RS232 level.

There is a first DUAL UART 57 which receives signals from address bus 49 and data bus 51. Dual UART 57 also receives control signals from microcontroller 47 over lines 59 and a decode logic section 59. Dual UART 57 converts data signals received from data bus 51 into an asynchronous serial stream which is sent out over lines 61 to a signal by pass multiplexer 63 and converts asynchronous serial signals received from signal by pass multiplexor 63 over lines 61 into a parallel stream which are sent out over bus 51. Dual UART 57 also converts parallel signals from address bus 49 into a serial stream which is sent out over lines 65 to signal by-pass multiplexer 63 and converts serial signals received from signal bypass multiplexer over lines 65 into a parallel signals for transmitted to address bus 49.

A first set of RS232 drivers 67 converts TTL level signals from signal by pass multiplexer 63 into RS232 levels for transmittal to the system console 15 and converts RS232 level signals received from system console 15 into TTL level signals for transmittal to signal bypass multiplexer 63. A second set of drivers 69 performs a similar function on signals transmitted to and from CPU port 33 and signal bypass multiplexer 63.

There is also a second DUAL UART 71, a second signal bypass multiplexer 73, a first set of RS232/RS422 current loop interface logic 75 and a second set of RS232/RS422 current loop interface logic 77 for communicating to and from ALM/IAC port 37 in host computer 15 and port 40 of user terminal 20-1. The difference between drivers 67 and 69 which are straight drivers and receivers and interface logic 75 and 77 is that interface logic 75 and 77 can take TTL and convert it to current, can take TTL and convert it to RS422 or can take TTL and convert it to RS232. The particular function that is selected is determined by microcontroller 47 and the particular cable that you connect.

Battery backed clock/calendar circuit 79 contains a single chip, namely, a clock that keeps the time of day, the day, the date, the year and also keeps leap year functions. Because it is battery backed, if power is lost the chip remains functional and maintains the time.

Circuit 79 is set by commands from microcontroller 47 and the actual date and time are read by microscontroller 47 through software commands.

Decode logic 59 decodes an address on address bus 49 determines whether device 17 is dealing with first UART 57, second UART 71, clock calendar circuit 79, local memory 81 or status information or whether it is a general byte. Signals from decode logic 59, clock signals and read and write signals from microcontroller 47 are fed into clock calendar circuit 79.

Watchdog timer circuit 83 contains a monostable flip-flop which generates a pulse that resets microcontroller 47. The pulse is sent out if the monstable flip-flop is allowed to expire. In order to prevent the monstable flip-flop from expiring a signal called "watchdog request" is generated. The signal is sent to watchdog timer 83 from miscellaneous signals/LED latch and buffers section 85 along line 87. The signal is generated by the program stored in firmware 89. Everytime the program goes through a loop it generates a refresh signal which is transmitted along line 89. If something malfunctions, either with the hardware or the software, and the hardware doesn't complete the loop in the desired time, microcontroller 47 gets reset, physically goes into a pull-up state and gets bypassed. The bypass signal, which bypass the signal bypass multiplexers 63 and 73 are sent out from miscellaneous signals, LED latch and buffers section 85 over lines 91. Front panel indicator light signals which are used to light the LED's on the front panel indicating the status of device 11 are sent out over lines 93.

Firmware section 89 comprises an 18K byte prom which contains the program for running device 11.

Ram 81 is a 2K byte Random Access Memory which is battery backed. RAM 81 contains the password, the phone numbers, the configuration and other items needed in the course of execution.

Switch register 95 receives signals from a front panel keyswitch 97 over lines 99 indicating whether device 11 is in a full access, limited access or no access mode of operation. Switch register 95 also receives switch information from a circuit board switch over lines 101 which allows for testing device 11.

Oscillator section 103 contains a pair of oscillators, one for generating a 3.6864 megahertz clock signal for the dual UARTS 57 and 71 which is sent out over lines 105 and the other for generating an 11.0592 megahertz clock signal for microcontroller 47 which is sent out over lines 107.

Battery 107 is a 3 volt lithium battery that is used to provide the power for the battery back clock calendar circuit 79 and the battery backed static RAM during the time power supply 45 is down, either because of a power failure or because the user physically turns the device off (i.e. turns the key to the "off" position). Diodes 109 coupled to battery 107 are switching diodes which are used to bypass battery 107 whenever 5 volts is supplied from main power supply 45.

As noted before, when device 17 is powered "off" it is essentially "dead". Accordingly, in order for data to move anywhere through device 17, the device must be powered "on".

In the "straight-through" mode of operation signals coming in from drivers 67 pass through signal bypass multiplexer 63 and are transmitted out through drivers 69. Signals coming from drivers 69 pass through signal bypass multiplexer 63 and are transmitted out through drivers 67. Signals coming in from interface logic 75 pass through signal bypass multiplexer 73 and are transmitted out through interface logic 77 and signals coming in from interface logic 77 pass through signal bypass multiplexer 73 and are transmitted out through interface logic 75.

In the other two modes of operation data coming into device 17 is sent into the respective UARTS 57 and 71. From the UARTS the data is sent to microcontroller 47 where it is then routed to its proper destination (i.e. the proper port) based on a set of criteria stored in RAM 81.

Commands consist of a single character (upper or lower case) preceded by a BREAK.

Below is a list of commands and the terminals and access levels at which the commands may be utilized.

| | Valid Access Levels | | |
|---|---|---|---|
| COMMAND | System Console | User Terminal | Remote Terminal |
| A - Password VIEW/CHANGE | N | | |
| B - Send BREAK | N,L,F | N,L,F | L,F |
| C - Conversation Mode ON/OFF | F | L,F | L,F |
| D - Locak Console DISABLE/ENABLE | | | L,F |
| E - END Session | N,L,F | N,L,F | N,L,F |
| H - HELP | N,L,F | N,L,F | N,L,F |
| J - Dial String VIEW/CHANGE | N,L,F | N,L,F | N,L,F |
| M - Remote Mode - SYSTEM | | | F |
| N - Remote Mode - NONE | N,L,F | N,L,F | N,L,F |
| S - SET date and Time | N | | |
| T - READ Date and Time | N,L,F | N,L,F | N,L,F |
| U - Remote Mode - USER | | | L,F |
| V - Configuration VIEW/CHANGE | N,L,F | N,L,F | N,L,F |
| ? - Status | N,L,F | N,L,F | N,L,F |
| Where  N = None | | | |
|        L = Limited | | | |
|        F = Full | | | |

The A command is valid ONLY at the System Console, and ONLY when the Access Level switch is in the NONE position. If these conditions are met the response will be:

\*\*\*Password VIEW/CHANGE\*\*\*
\*\*\*01/01/85 00:00\*\*\*
\*\*\*Password: λ......]\*\*\*
(where ..... is the current password)
\*\*\*Exit (0), or Password Change (1)?\*\*\*

In this mode the caller will be able to proceed with just a CR or LF input.

The B command is valid at the System console or User terminal, and at the Remote terminal if in the USER or SYSTEM modes. This command sends a BREAK to the host system port indicated below:

| COMMANDING TERMINAL | PORT TO RECEIVE BREAK |
|---|---|
| System Console | TTO/TTI |
| User Terminal | ALM/IAC |
| Remote Terminal | TTO/TTI (if in SYSTEM mode) |
| | ALM/IAC (if in USER mode) |

The C command is for the conversation mode and is Valid at Remote terminal if in SYSTEM or USER Modes, is Valid at System console if in SYSTEM mode and is Valid at User terminal if in USER mode.

Conversation mode allows the remote operator to communicate directly with the local Operator. Data input at the local terminal appears at the remote terminal, and any data input at the remote terminal appears at the local terminal. None of this information is forwarded to the currently-connected computer port. However, any data transmitted by the computer is presented to the local and remote terminals.

This command operates in toggle fashion; if Conversation mode is OFF when this command is issued, Conversation mode will turn ON. If Conversation mode is ON when this command is issued, Conversation mode will turn OFF.

The following events will also turn Conversation mode OFF:

| | |
|---|---|
| <BREAK> E Command | (end remote session) |
| <BREAK> M Command | (enter SYSTEM mode) |
| <BREAK> N Command | (enter NORMAL mode) |
| <BREAK> U Command | (enter USER mode) |
| Loss of carrier | |

The D command is only valid at the Remote terminal and is only valid when in SYSTEM or USER Modes.

This command is used by the Remote operator to disable the local terminal.

This command operates in toggle fashion; if the local terminal is ENABLED when this command is issued, it will be DISABLED. If the local terminal is DISABLE when this command is issued, it will be ENABLED.

The E command is used to end current connect mode and to disconnect the phone connection to/from the remote terminal.

The response at the commanding terminal to the <BREAK> E command will be:
*END Session*
*01/01/85 00:00*

The H command will list all available commands, and the revision of the Firmware.

The J command is used to view and change dial strings. It can ONLY be input at the System console, and changes can ONLY be made when in the NONE access Level setting.

Dialstrings are the actual strings sent to the autodial modem to dial the phone number that the caller left. These strings should NOT contain the "ATD" prefix, this will be added by the firmware before sending the dialstring to the modem.

The M command is used to connect the Remote terminal to the TTO/TTI port of the host computer. This command can ONLY be issued by the Remote terminal, and ONLY in the FULL Access Level setting. This command gives System console capabilities to the Remote operator, as well as the local System Console. This command will also do the following:
Turn OFF conversation mode (if ON)
ENABLE local console (if DISABLED)
Terminate USER mode (if in USER mode)
Turn OFF the front panel USER light (if ON)

The N command is used to "un-patch" the Remote terminal. It may be issued by the System Console, User Terminal, or Remote terminal. This command is independent of Access Level. This command will also do the following:
Turn OFF Conversation mode (if ON)
ENABLE local console (if DISABLED)
Terminate USER Mode (if in USER mode)
Turn OFF the front panel USER light (if ON)
Terminate SYSTEM mode (if in SYSTEM mode)
Turn OFF the front panel SYSTEM light (if ON)

The S command is used to set the data and time in the battery-backed-up Clock/Calendar integrated circuit.

The date and time information if useful for tagging COMSWITCH-II events.

This command is ONLY valid at the System console, and ONLY in NONE access level.

The T command displays the data and time setting from the battery-backed-up Clock/Calendar integrated circuit.

It may be issued by the System Console, User terminal, or Remote terminal. This command is independent or Access Level.

The U command is used to connect the Remote terminal to the ALM/IAC port of the host computer. This command can Only be issued by the Remote terminal, and ONLY in the FULL or LIMITED Access Level settings. This command gives User terminal capabilities to the Remote operator, as well as the local USER terminal. This command will also do the following:
Turn OFF Conversation mode (if ON)
ENABLE local console (if DISABLED)
Terminate SYSTEM mode (if in SYSTEM mode)
Turn OFF the front panel SYSTEM light (if ON)

The V command is used to view and change the parameters of the various serial I/O ports. This system avoids the alternative of numerous dipswitches or jumpers, and also allows the remote operator to verify that the configuration parameters match those of the host system. These parameters are stored in Nonvolatile battery-backed-up RAM.

The ? command indicated the current status of the device 11. The Remote (operating) mode indicates the current connection arrangement between the remote port and the CPU/SYS and ALM/USER pairs:
NONE—Remote port is currently not patched to any of the host system ports.
USER—Remote port is currently patched to either the ALM/IAC port or the User terminal.
SYSTEM—Remote port is currently patched to either the TTO/TTI port or the System console.

If the commanding terminal is Remote and the device is still in "straight-through" mode, instead of one of the above "remote mode" messages being displayed, the following message will be displayed:
*STRAIGHT-THROUGH Mode*

The Conversation mode may be turned ON and OFF as described in the BREAK C command. Conversation mode allows direct communication between the remote and the local operator (at the currently connected local console-System console in SYSTEM mode, User terminal in USER mode).
OFF—Conversation mode is OFF, traffic from the local and remote terminal is directed to the host.
ON—Conversation mode is ON, traffic is directly between the remote and local terminals (System console or User terminal depending on mode).

The front panel Access Level keyswitch 97 provides the first level of security by limiting the type of access allowed by the remote caller. The key may be removed in each of the positions, preventing unauthorized switch changes. The level of access allowed at each setting is as follows:
NONE—Remote port will be unable to connect to the host system, and cannot change any of the configuration data. Local operator will be able to change password and dialstrings.
LIMITED—Remote port will ONLY be able to connect to the host system ALM/IAC port or communicate with the User terminal. Will not be able to change any of configuration data. Local operator cannot change password or dialstrings.

FULL—Remote port can connect to both port/pairs of the host system, and can change the configuration parameters. Local operator cannot change password or dialstrings.

Figure 3:
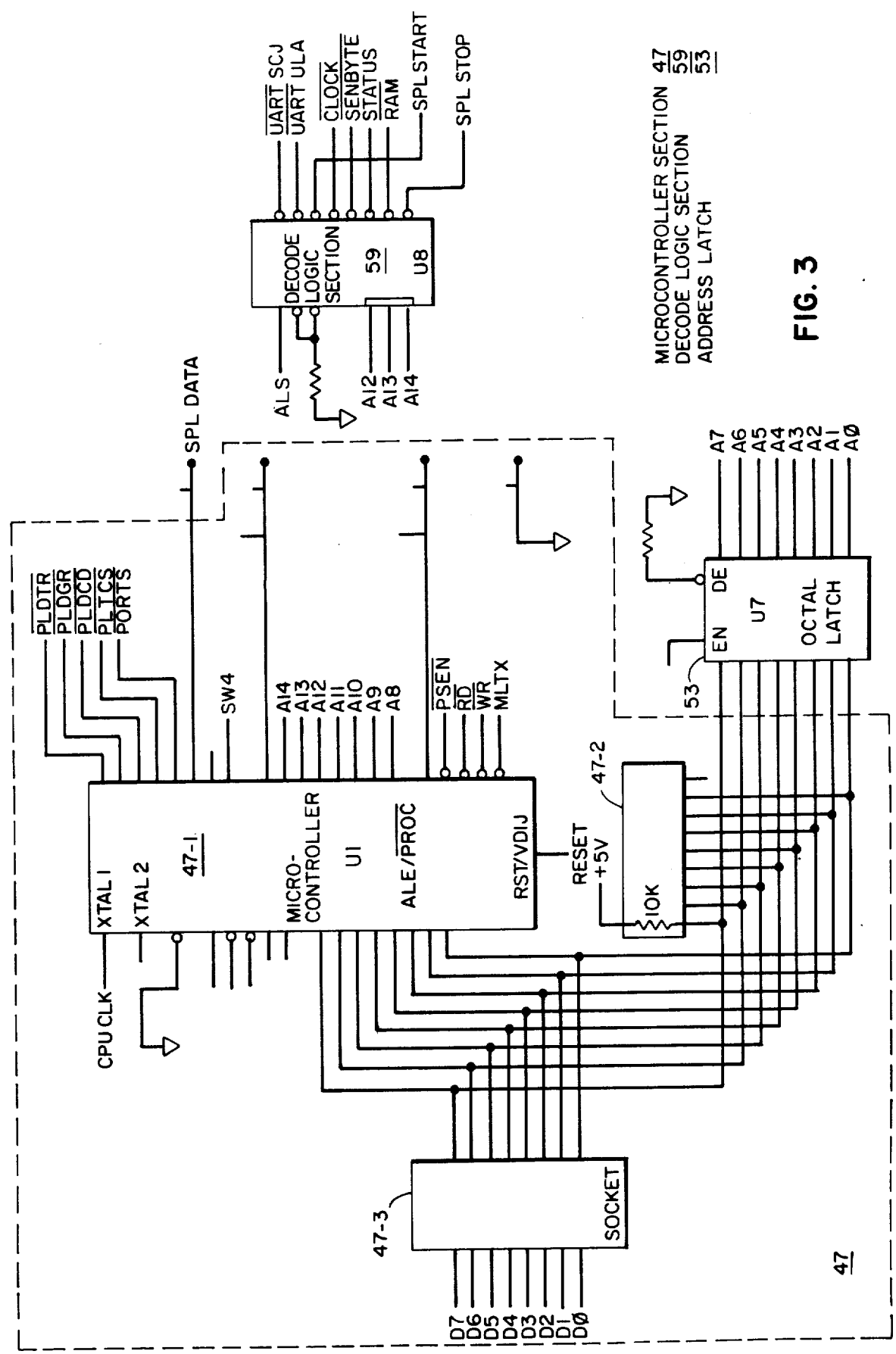
FIG. 3 is a schematic diagram of the microcontroller section 47, decode logic section 59 and the address latch section 53 in the control and switching device 11 shown in FIG. 2.

Referring now to FIG. 3 there is illustrated a schematic diagram of microcontroller section 47 decode logic section 59 and address latch section 53. Microcontroller section 47 includes a microcontroller chip 47-1, a set of pull up resistors 47-2 and a test socket 47-3. Address latch section 26 includes an octal latch 26-1. Microcontroller chip 47-1 is essentially a microprocessor which includes a UART and a RAM. Chip 47-1 has eight pins P00 through P07 which are coupled at some times to lines containing the data bus and at other times to lines containing 8 bits of the address bus. Octal latch 26-1 transfers data received over input pins 3,4,5,8,13,14,17 and 18 to output pins 2,5,6,9,12,15,16 and 19 whenever it is told to do so by microcontroller 47-1. Decoder section 59 comprises a 1 out of 8 decoder. It receives address information, i.e. the top four address bits, from the address bus, decodes the information and then sends the information to the proper location.

Referring now to FIG. 4, there is illustrated a schematic diagram of firmware section 89, switch register section 95 and the battery backed RAM section 81. Firmware section 89 comprises a 16K by 8 bit programmable ROM 89-1 that contains the program that controls device 11. It receives inputs from the address bus 49 over lines A0 through A13 and also receives the signal $\overline{PSEN}$. The signal $\overline{PSEN}$ is the signal telling ROM 89-1 that it has information to put out and it puts out the information on the data bus over lines D0 through D7. Battery backed RAM section 81 comprises a 2K by 8 bit RAM 81-1 that can be written into and read out of for storing information that is required by device 11. RAM 81-1 receives inputs from address line A0 through A10 and puts information out on the data bus 51 over lines D0 through D7. RAM 81-1 also receives data signals from data bus 51 from lines D0 through D7. Whether RAM 81-1 is reading or writing is controlled by signals received at pins 20-21. RAM 81-1 is powered from either 5 volts or from lithium battery 107.

Switch register section 95 includes an 8 way pull-up resistor 91-1, a four position dip switch 95-2, a one out of 8 multiplexer 95-3 and a negative input AND gate. Resistor 95-1 insures that the lines are held high if they are not being pulled low.

Figure 5:
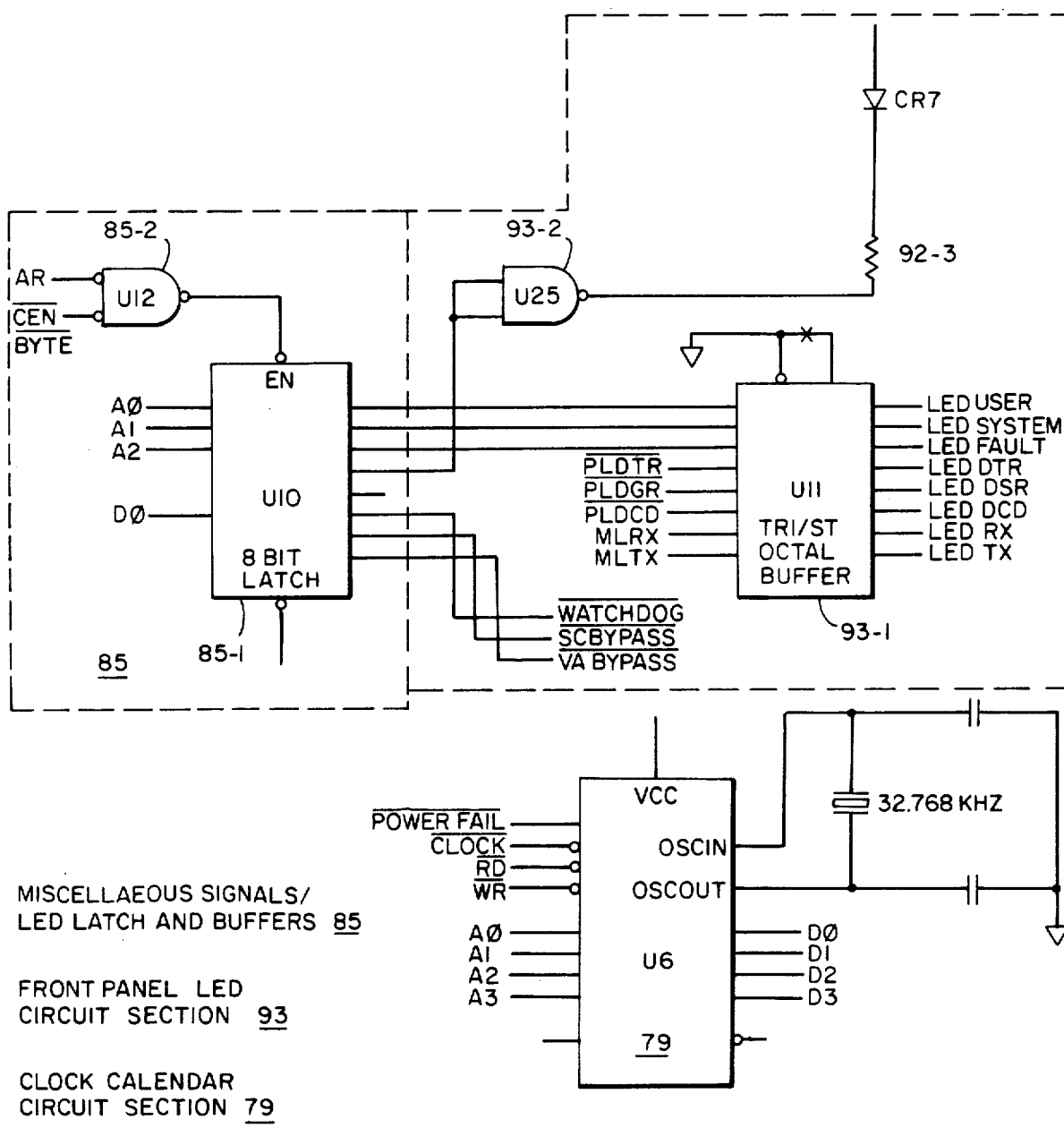
FIG. 5 is a schematic diagram of the battery backed clock calendar circuit 81, the miscellaneous signals LED latch and the buffers section 85 and the front panel LED's the control and switching device shown in FIG. 2.

Referring now to FIG. 5, there is illustrated a schematic diagram of the battery backed clock calendar circuit 79, the miscellaneous signals LED latch and buffers section 85 and the front panel LED circuit section 93. Circuit 79 includes an integrated circuit chip 79-1, 32.768 KHZ oscillator 79-2 and a pair of capacitors 79-3 and 79-4. Chip 79-1 is powered by either the main power supply or from lithium battery 107 and is connected to lines A0 to A3 of the address bus and lines D0 to D3 of the data bus. Miscellaneous signals section 85 includes an 8 bit latch and an AND gate 85-2. Front panel LED section includes an octal buffer tri-state driver 93-1, a NAND gate 93-2, a limiting resistor 93-3 and an LED 93-4.

Referring now to FIG. 6, there is shown a schematic diagram of dual UART sections 57 and some of the drivers 69 for connection to CPU port 33 Dual UART section 57 includes a dual UART 57-1 which serves to transmit and receive serial information and an inverter chip 57-2. Dual UART 57-1 is coupled to lines D0 through D7 on data bus 51. The drivers are labelled 69-1 and 69-2. Each driver 69-1, 69-2 has an associated capacitor 69-3 and 69-4. Driver 69-2 also has an associated resistor 69-5.

Referring now to FIG. 7, there is illustrated a schematic diagram of some of the drivers 67 and 69 for the system console port and the CPU port and the signal bypass multiplexer 63 associated therewith. Multiplexer 63 is a two line multiplexer. Elements 67-1, 67-2, 67-3 and 67-4 are RS232 to TTO level converters for the system console port. Each level converter has an associated capacitor 67-5 through 67-8 for filtering purposes and converter 67-2 also has an associated pull-up resistor 67-9. Converters 67-1 and 67-2 are used for the input signals while converters 67-3 and 67-4 are used to provide the output signals.

Figure 8:
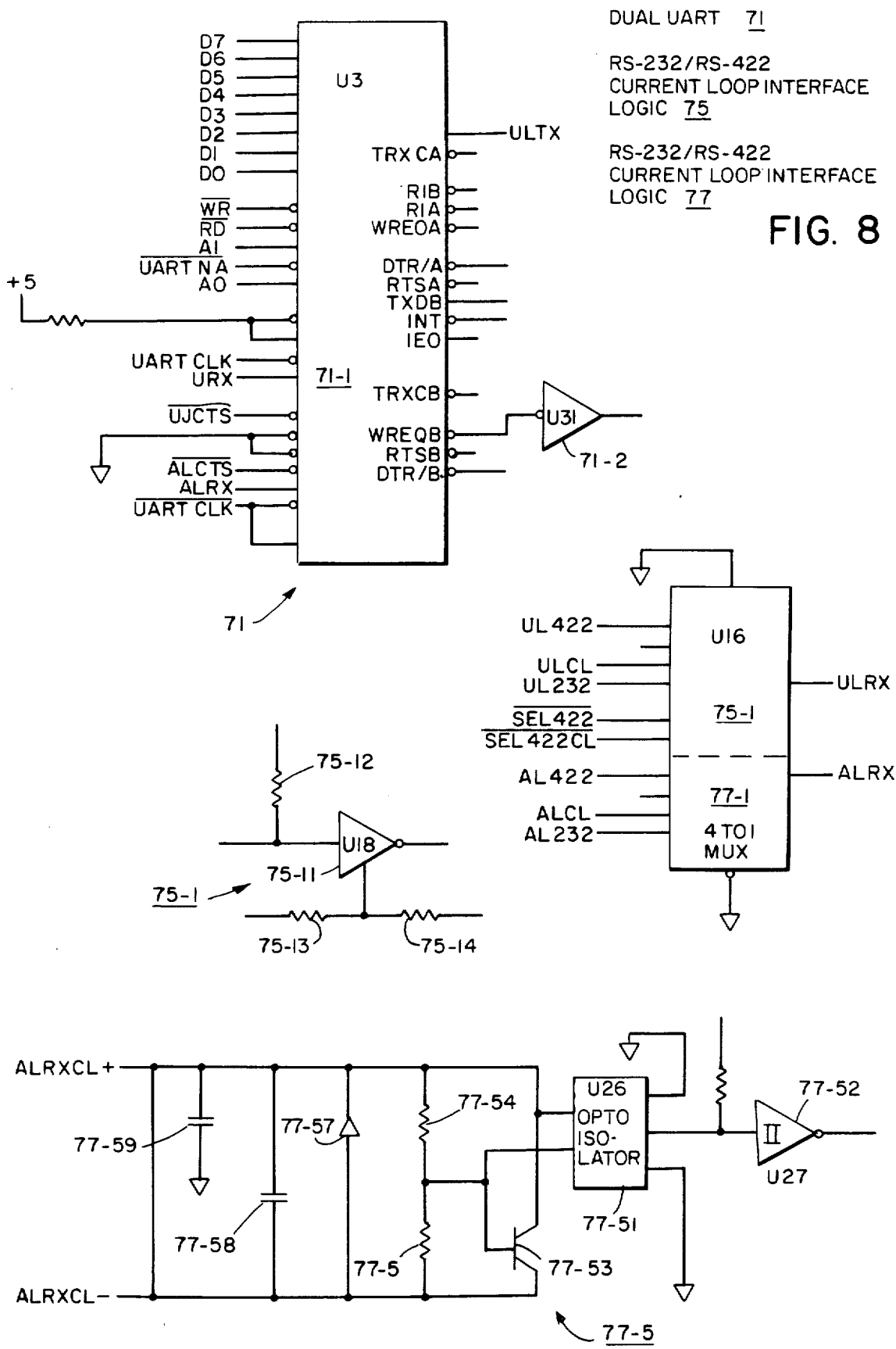
FIG. 8 is a schematic diagram of a portion of current loop interface logic 75 and 77 for the shared user port CRT and for the ALM/IAC port and the DUAL UART 71 associated therewith in the control and switching device shown in FIG. 2.

Referring now to FIG. 8, there is illustrated a schematic diagram of dual UART section 71 and portions of current loop interface logic sections 75 and 77 UART section 71 includes a DUAL UART 71-1 and an inverter 71-2. Element 75, circuit 75-1 and circuit 77-1 is one of the logic necessary to convert signals coming in from the shared user CRT port to TTO levels. Circuit 75-1 which includes an inverter 75-11 and three resistors 75-12, 75-13 and 75-14 is the input circuit for the user port. Circuit 77-5 is the input circuit for the ALM port. The circuit includes an opto-isolator 77-51, an inverter 77-52, a transistor 77-53, a pair of resistors 77-54 and 77-55, a diode 77-57 and a pair of bypass capacitors 77-58 and 77-59.

Figure 9:
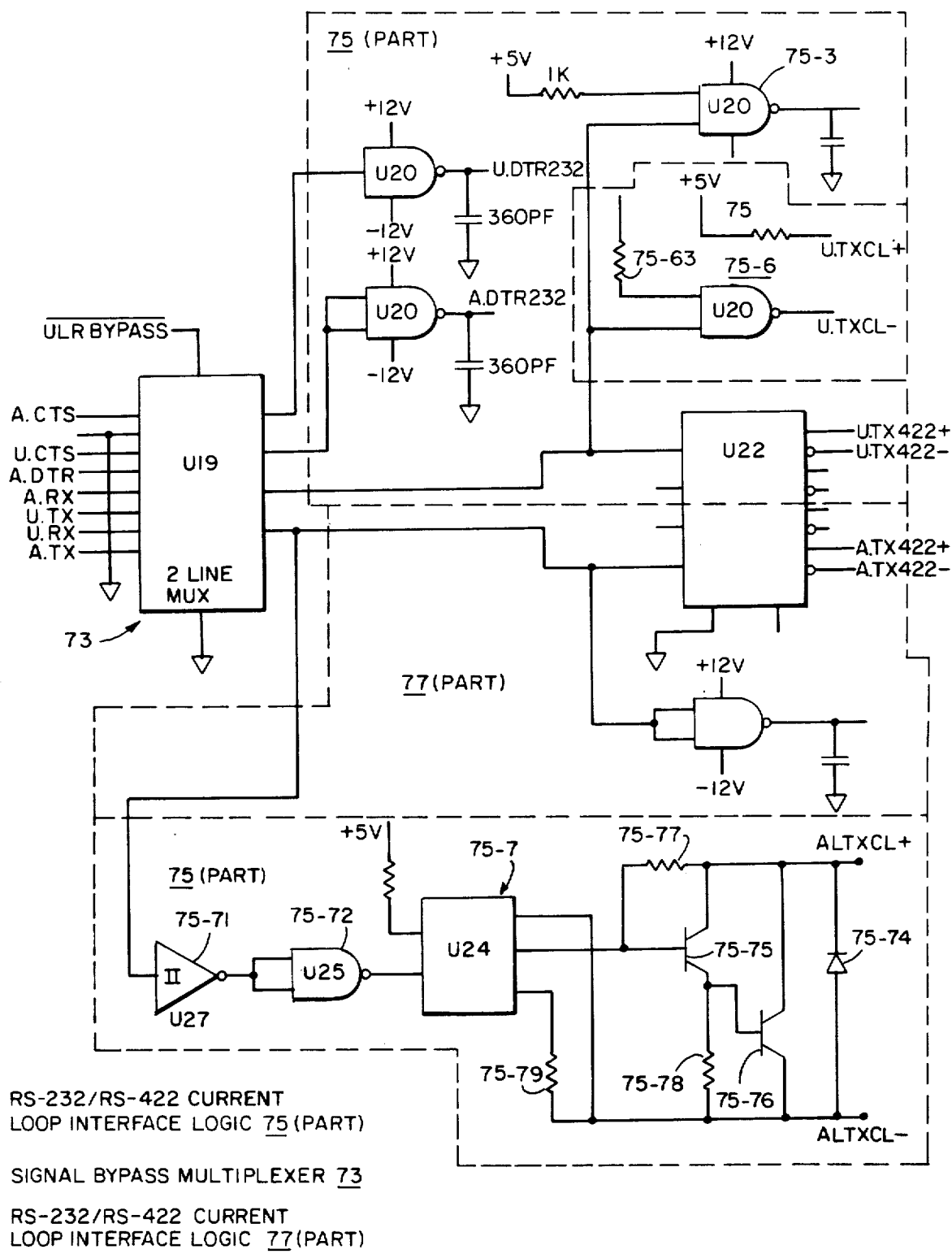
FIG. 9 is a schematic diagram of a portion current loop interface logic 75 and 77 for the shared user CRT port and the ALM/IAC port and the associated signal bypass multiplexer 73 in the control and switching device shown in FIG. 2.

Referring now to FIG. 9 there is illustrated a schematic diagram a portion of current loop interface logic 77, a portion of current loop interface logic 79 and signal bypass multiplexer 73. There is an area of logic 75-6 which transmits active current to the shared user port and it includes a resistor 75-61 which supplies current to the loop, an AND gate 75-62 which supplies power to sink the current and a pull-up resistor 75-63 to pull up the unused input of gate 75-62.

Logic 75-3 is the logic necessary for the shared user port to drive the active current loop and logic 75-7 is the logic necessary to transmit passive current loop to the ALM/IAC port. Logic 75-7 includes an inverter 75-71, a gate 75-72 an optoisolator 75-73, a diode 75-74, two transistors 75-75 and 75-76 and the resistors 75-77, 75-78 and 75-79. The two transistors and three resistors function as a Darlington pair to give the very low impedance required by the current loop. Element 73 is a two line multiplexer.

Referring now to FIG. 10 there is illustrated a schematic diagram of a portion of the RS-232/RS-422 current loop interface logic 75 and a portion of the RS-232/RS-422 current loop interface logic 77. There is an intergrated circuit 80 which converts 422 logic to TTL logic, one portion 80-1 is used for interface logic 75 and the other portion is used for interface logic 77. There is also a pair of drivers 75-1 and 75-2 which are a part of interface logic 75 and a pair of drivers 77-2 and 77-2 which are a part of interface logic 77. Each driver includes a capacitor, the capacitors being labelled 75-11, 75-12, 77-11 and 77-12. Drivers 75-2 and 77-2 also include pull-up resistors 75-13 and 77-13 respectively.

Figure 11:
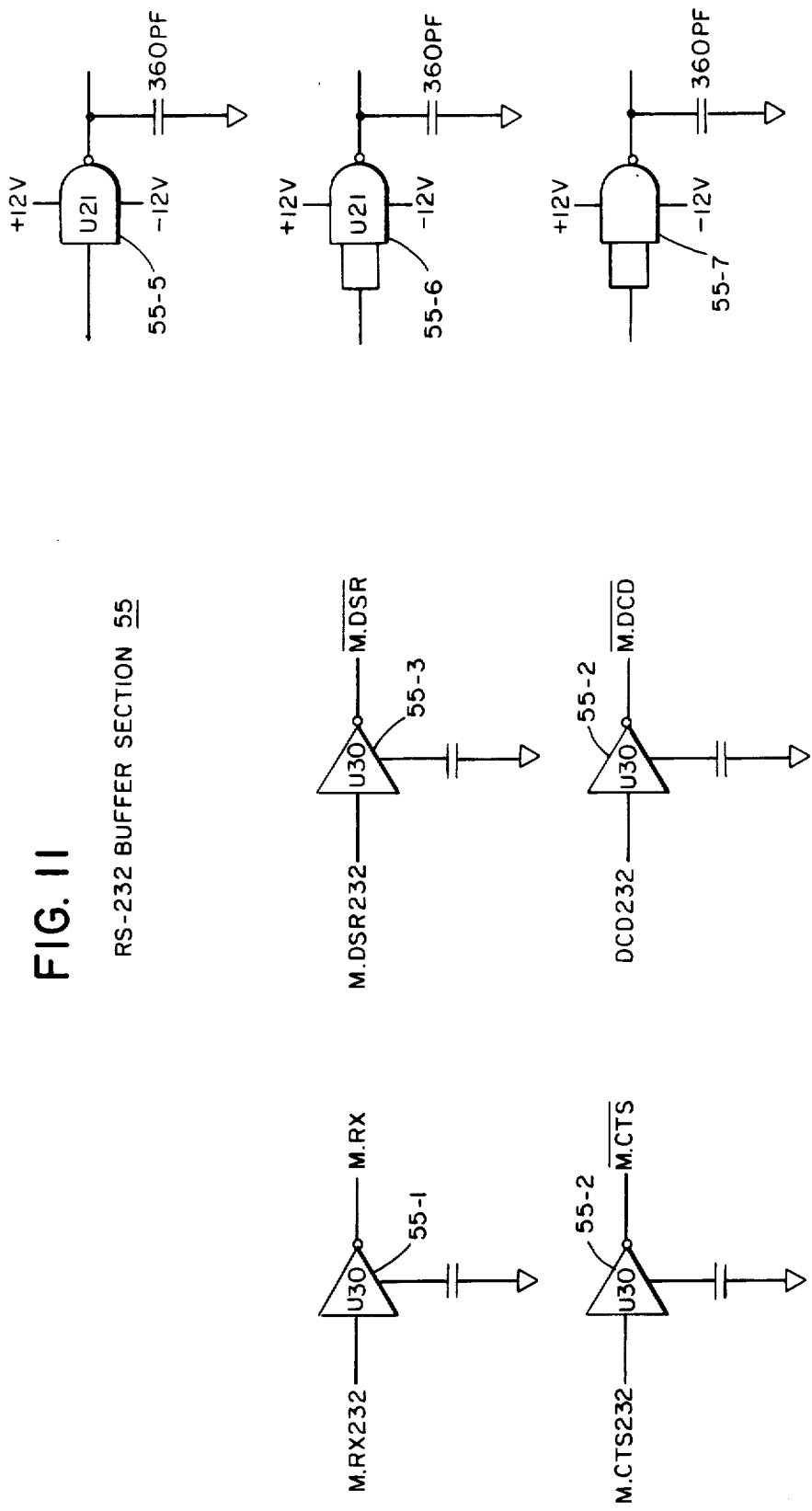
FIG. 11 is a schematic diagram of the modem port buffer section 55 in the control and switching device shown in FIG. 2.

Referring now to FIG. 11, there is illustrated a schematic diagram of the RS-232 buffer section 55. RS-232 buffer section 55 contains the RS-232 to TTO and TTO to RS-232 logic necessary to interface with modem 19.

The section includes four TTL to 232 converters 55-1 through 55-4 and three 232 to TTL converters 55-5 through 55-7. Each one of the converters has an associated capacitor, as shown.

Figure 12:
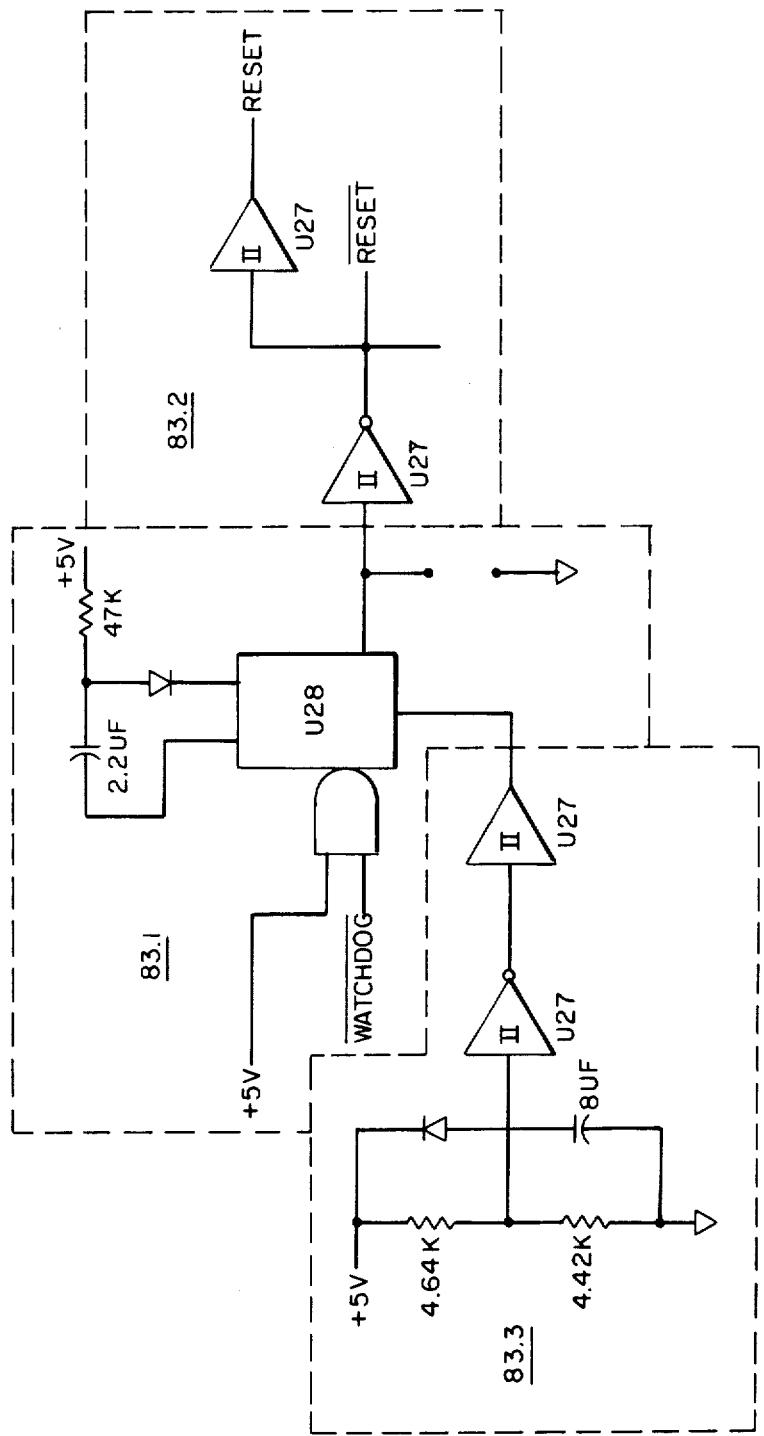
FIG. 12 is a schematic diagram of a portion of the watchdog timer section 83 in the control and switching device shown in FIG. 2.

Referring now to FIG. 12, there is illustrated a schematic diagram of a portion of the watchdog timer section 83. The section includes a retriggerable one shot 83-1 and a pair of inverters 83-2 and 83-3. The section also includes some logic 83-4 which serves to keep the logic reset at "power-up".

Referring now to FIG. 13, there is illustrated a schematic diagram of the microcontroller and dual UART oscillator section 103 and a portion 83-4 of the watchdog timer section. Oscillator section 103 includes an oscillator circuit 103-1 which produces the UART clock. Section 83-4 is a power fail detect circuit. It comprises, essentially, a comparator circuit and includes a comparator 83-41, a zener diode 83-42 and three NOR gates 83-43, 83-44 and 83-45.

The parts making up control and switching device 17 may be in the form of IC chips or sections of IC chips and may be as listed in the following table.

| COMPONENT NUMBER | CHIP TYPE | MANUFACTURER |
| --- | --- | --- |
| U1 | AMD 8031 | Various |
| U2 | AMDZ8531 | AMD |
| U3 | AMZ 8531 | AMD |
| U4 | TC5517APL | NEC |
| U5 | 27128 | Intel |
| U6 | RP5C15 | Ricoh |
| U7 | 74LS373 | Signetics |
| U8 | 74LS138 | Various |
| U9 | 74LS251 | Various |
| U10 | 74LS259 | Various |
| U11 | 74LS241 | Various |
| U12 | 74LS32 | Various |
| U13 | 1489AC | Motorola |
| U14 | 1488 | Motorola |
| U15 | 74LS157 | Various |
| U16 | 74S153 | Various |
| U17 | 1489AL | Motorola |
| U18 | 1489AL | Motorola |
| U19 | 74LS157 | Various |
| U20 | 1488 | Motorola |
| U21 | 1488 | Motorola |
| U22 | 26LS31 | Various |
| U23 | 26LS32 | Various |
| U24 | MCT2 | Motorola |
| U25 | 74S38 | Motorola |
| U26 | MCT2 | Motorola |
| U27 | 74LS14 | Various |
| U28 | 74LS123 | Various |
| U29 | 3.527MHZ | Various |
| U30 | 1489AL | Motorola |
| U31 | 74S04 | Various |
| U32 | LM339 | National |
| U33 | 185A030 | TBP |

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A computer network for transmitting and receiving data over a telephone line said computer network comprising:

a. a local site, said local site including:

i. a host computer having a central processing unit (CPU) port and an asynchronous line multiplexer/intelligent asynchronous line multiplexer (ALM/IAC) port, ii. a system console, iii. a user terminal, iv. a modem coupled to said telephone line, and v. a control and switching device coupled to said CPU port, said ALM/IAC port, said modem, said system console and said user terminal for controlling the flow of data between said host computer, said user terminal, said system console and said modem, said control and switching device having a powered off position and a powered on position, neither said system console, said user terminal nor said remote terminal having access to said host computer when said control and switching device is in said powered off position, b. a remote site, said remote site including:

i. a remote terminal, and ii. a modem coupled to said remote terminal and to said telephone line.

2. The computer network of claim 1 and wherein said control and switching device includes:

a. a first port for coupling said control and switching device to said system console, b. a second port for coupling said control and switching device to said CPU port in said host computer, c. a third port for coupling said control and switching device to said ALM/IAC port in said host computer, d. a fourth port for coupling said control and switching device to said modem, e. a fifth port for coupling said control and switching device to said user terminal, and f. an electrically powered switch assembly having three positions for providing three degrees of access for said remote terminal to said host computer.

3. The computer network of claim 2 and wherein said three degrees of access are no access, limited access and full access and wherein when the switch is in a first position, the remote terminal has no access to the host computer, when the switch is in a second position, the remote terminal can connect to the ALM/IAC port of the host computer or communicate with the user terminal, but cannot change configuration data, and when the switch is in a third position, the remote terminal can connect to both ports of the host computer and can change configuration parameters.

4. The computer network of claim 3 and wherein said control and switching device further includes a microcontroller.

5. The computer network of claim 4 and wherein said control and switching device further includes a PROM and a RAM.

6. The computer network of claim 5 and wherein said control and switching device further includes means for interfacing said microcontroller to said ALM/IAC port, to said user terminal port, to said CPU port and said system console and means for interfacing said microcontroller to said modem.

7. The computer network of claim 4 and wherein said device has a plurality of operating modes and said device further includes means responsive to a signal from said system console or from said remote terminal for changing the operating mode of the network.

8. The computer network of claim 7 and wherein said signal is achieved by depressing a key in said system console or said user terminal or said remote terminal labelled Break Key followed by entry of a selected one of a plurality of predetermined ASC11 characters.

9. The computer network of claim 8 and wherein one ADC11 character places one terminal of the user terminal and the remote terminal in line to the CPU port and allows the other terminal to receive data only from said CPU port.

10. The computer network of claim 9 and wherein another ASCII character locks out the host computer and places both the remote terminal and the user terminal in a conversation mode.

11. The computer network of claim 10 and wherein another ASCII character locks out the host computer and places the local terminal off-line but capable of issuing commands to the control and switching device and places the remote terminal on-line to the CPU port.

12. The computer network of claim 11 and wherein another ASCII character places both terminals on-line to both ports of said host computer.

13. A control and switching device for use in interconnecting a host computer, a system console, a user terminal and a modem at a first location to a remote terminal and a modem at a remote location so that the remote terminal can access said host computer over a telephone line, said host computer including a central processing unit port and an asynchronous line multiplexer/intelligent asynchronous line multiplexer port, said control and switching device comprising:
   a. a first port for coupling said control and switching device to said system console,
   b. a second port for coupling said control and switching device to said CPU port in said host computer,
   c. a third port for coupling said control and switching device to said ALM/IAC port in said host computer,
   d. a fourth port for coupling said control and switching device to said modem,
   e. a fifth port for coupling said control and switching device to said user terminal, and
   f. a switch assembly having three positions for providing three degrees of access for said remote terminal to said host computer,
   g. said control and switching device having a powered off position and a powered on position, neither said system console, said user terminal nor said remote terminal having access to said host computer when said control and switching device is in said powered off position.

14. The control and switching device of claim 13 and wherein said three degrees of access are no access, limited access and full access and wherein when the switch is in a first position, the remote terminal has no access to the host computer, when the switch is in a second position, the remote terminal can connect to the ALM/IAC port of the host computer or communicate with the user terminal, but cannot change configuration data, and when the switch is in a third position, the remote terminal can connect to both ports of the host computer and can change configuration parameters.

15. The control and switching device of claim 14 and further includes a microcontroller.

16. The control and switching device of claim 15 and further including a PROM and a RAM.

17. The control and switching device of claim 16 and further including means for interfacing said microcontroller, to said ALM/IAC port, said user terminal port, said CPU port and said system console port and means for interfacing said microcontroller to said modem.

18. The control and switching device of claim 17 and wherein a command can be issued which places the user terminal off-line but capable of issuing commands to the control and switching device and places the remote terminal on-line to the CPU port.

19. The control and switching device of claim 18 and wherein another character places both terminals on-line to both ports of said CPU.

* * * * *